(12) United States Patent
Altman et al.

(10) Patent No.: US 8,151,092 B2
(45) Date of Patent: Apr. 3, 2012

(54) CONTROL SIGNAL MEMOIZATION IN A MULTIPLE INSTRUCTION ISSUE MICROPROCESSOR

(75) Inventors: Erik Richter Altman, Danbury, CT (US); Michael Karl Gschwind, Chappaqua, NY (US); Jude A. Rivers, Cortlandt Manor, NY (US); Sumedh W. Sathaye, Lagrangeville, NY (US); John-David Wellman, Hopewell Junction, NY (US); Victor V. Zyuban, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1843 days.

(21) Appl. No.: 11/034,284

(22) Filed: Jan. 12, 2005

(65) Prior Publication Data

US 2006/0155965 A1 Jul. 13, 2006

(51) Int. Cl.
*G06F 9/30* (2006.01)
(52) U.S. Cl. ........................ 712/215; 712/216
(58) Field of Classification Search .................. 712/215, 712/216
See application file for complete search history.

(56) References Cited

U.S. PATENT DOCUMENTS

| | | | | |
|---|---|---|---|---|
| 5,812,812 A * | 9/1998 | Afsar et al. | ...... | 712/216 |
| 5,958,041 A * | 9/1999 | Petolino et al. | ...... | 712/214 |
| 6,016,540 A * | 1/2000 | Zaidi et al. | ...... | 712/214 |
| 6,108,769 A * | 8/2000 | Chinnakonda et al. | ...... | 712/216 |
| 6,804,770 B2 * | 10/2004 | Logan et al. | ...... | 712/215 |
| 6,826,682 B1 * | 11/2004 | Rozas et al. | ...... | 712/244 |
| 2002/0138714 A1 * | 9/2002 | Leibholz et al. | ...... | 712/217 |

OTHER PUBLICATIONS

Moshovos et al., "Streamlining Inter-operation Memory Communication via Data Dependence Prediction," 1997, pp. 1-11.*
Hennessy, "Computer Architecture—A Quantitative Approach, $2^{nd}$ Edition", 1996, pp. 251-253.*

* cited by examiner

*Primary Examiner* — David Huisman
(74) *Attorney, Agent, or Firm* — Yee & Associates, P.C.; William Stock

(57) ABSTRACT

A dynamic predictive and/or exact caching mechanism is provided in various stages of a microprocessor pipeline so that various control signals can be stored and memorized in the course of program execution. Exact control signal vector caching may be done. Whenever an issue group is formed following instruction decode, register renaming, and dependency checking, an encoded copy of the issue group information can be cached under the tag of the leading instruction. The resulting dependency cache or control vector cache can be accessed right at the beginning of the instruction issue logic stage of the microprocessor pipeline the next time the corresponding group of instructions come up for re-execution. Since the encoded issue group bit pattern may be accessed in a single cycle out of the cache, the resulting microprocessor pipeline with this embodiment can be seen as two parallel pipes, where the shorter pipe is followed if there is a dependency cache or control vector cache hit.

6 Claims, 10 Drawing Sheets

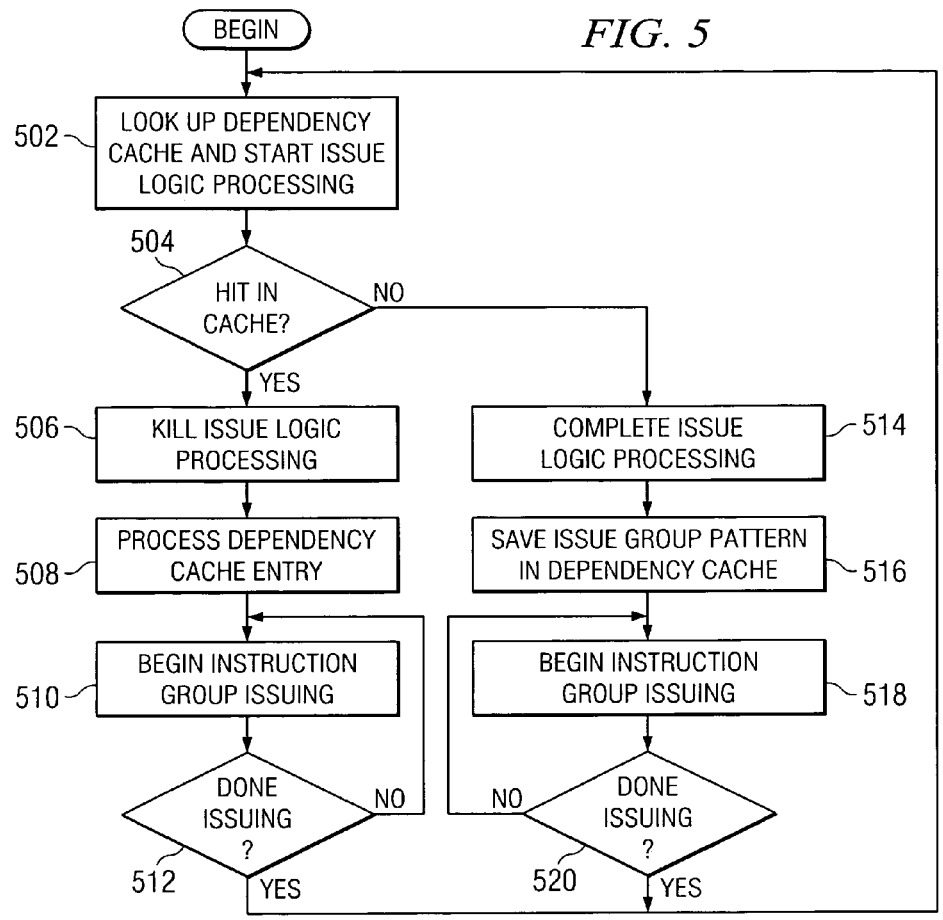
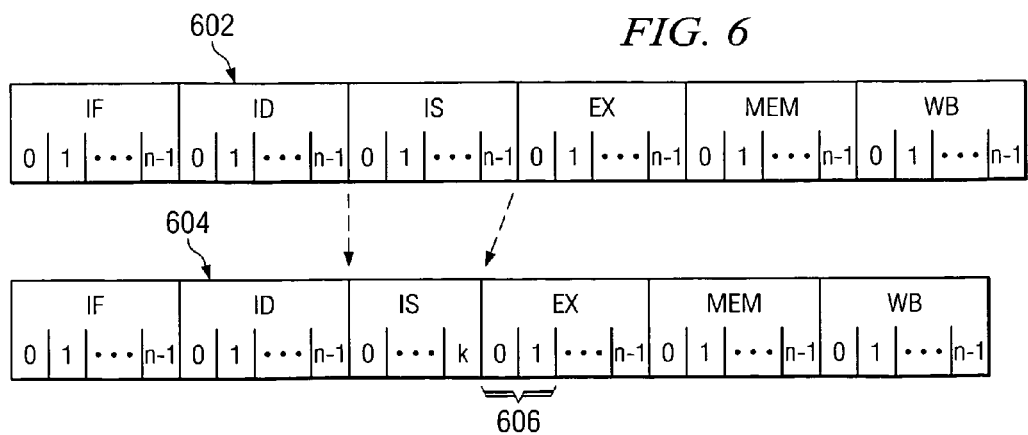

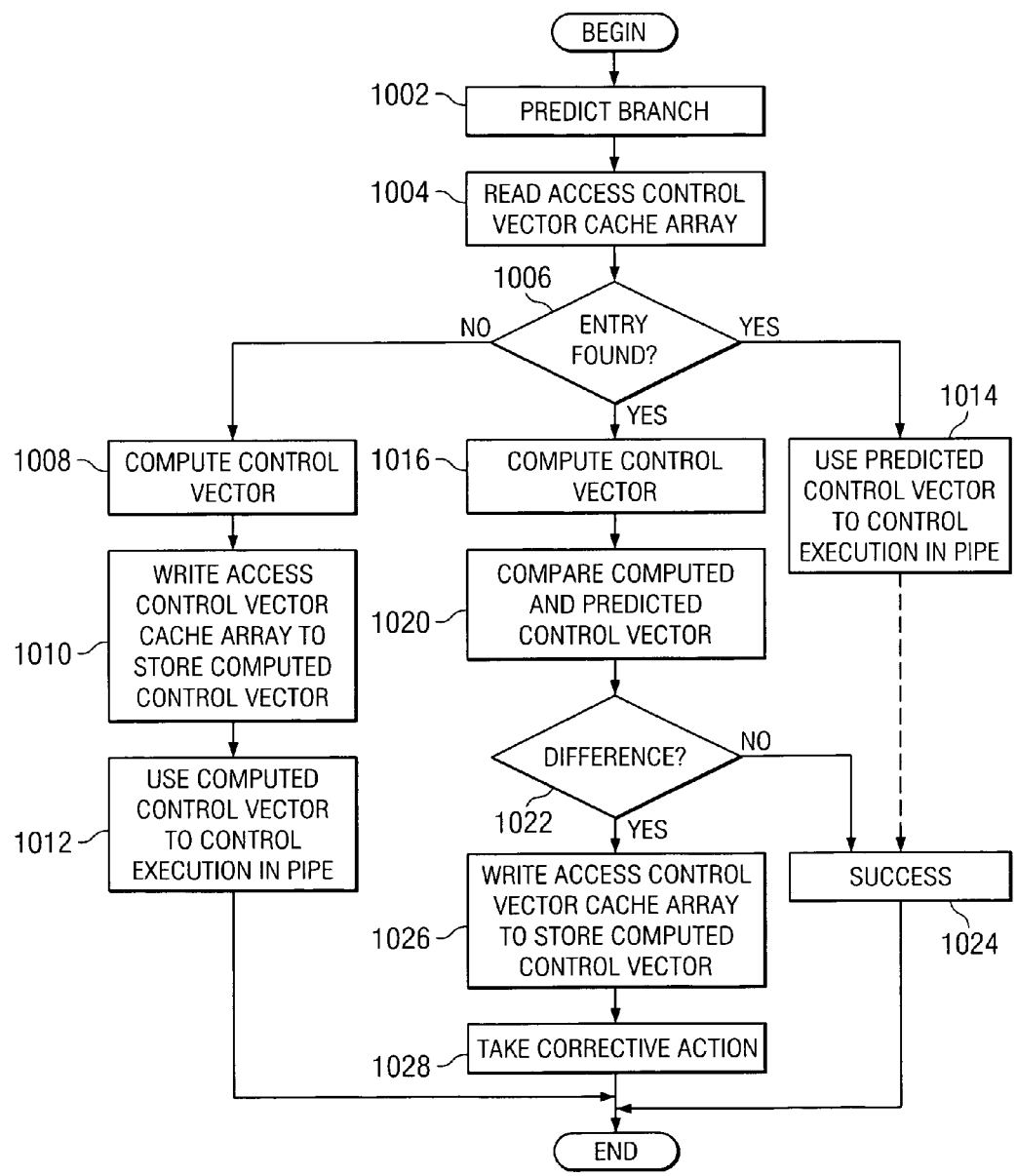

CONTROL SIGNAL MEMOIZATION IN A MULTIPLE INSTRUCTION ISSUE MICROPROCESSOR

BACKGROUND OF THE INVENTION

1. Technical Field

The present invention relates to data processing and, in particular, to multiple instruction issue in a high performance processor. Still more particularly, the present invention provides a method and apparatus for control signal memoization in a multiple instruction issue microprocessor.

2. Description of Related Art

As higher frequency microarchitectures are demanded by the marketplace, computer architects have strived to deliver these processors. While in the past increases in frequency have directly translated into performance, recent architectures have suffered from cycles per instruction (CPI) degradation often negating the benefits of higher frequency operation. A recent example includes the Pentium® 4 processor, which produced inferior performance for several benchmarks when executed at the same or slightly higher frequency than a previous Pentium® III processor. Pentium® 4 and Pentium® III are trademarks of Intel Corporation.

More complicated microprocessors include multiple execution units. For example, a microprocessor may include two integer execution units, two floating-point execution units, a comparison execution unit, and a load/store execution unit. In this example, the microprocessor may execute up to six instructions at a time. A pipeline in the processor may include an instruction fetch phase, an instruction decode phase, an instruction issue phase, an instruction execution phase, a memory read/write phase, and a retire phase. The microprocessor may then potentially fetch, decode, issue, and execute instructions in groups of up to six. In the above example, the microprocessor may fetch up to two integer instructions, two floating-point instructions, a compare instruction, and a load or store instruction as a group. To issue an instruction group, the microprocessor must compute a control vector for the group.

The root cause for CPI degradation in aggressive multiple issue microprocessors is often tracked down to the deep pipelines necessary to continue ensuring increases in operating frequencies. A common occurrence in these pipelines is the generation and regeneration of various control flow signals. Often, the control signals generated in many of these pipeline stages are repetitive. Therefore, a great deal of processing overhead is spent on computing control signals in multiple instruction issue microprocessors.

SUMMARY OF THE INVENTION

The present invention recognizes the disadvantages of the prior art and provides a dynamic predictive and/or exact caching apparatus and mechanism in various stages of a microprocessor pipeline so that various control signals can be stored and memorized in the course of program execution. Some critical path pipeline stages, necessary for generating some control signals, can be bypassed and these control signals not always regenerated thus saving the overhead associated with doing so.

In one possible embodiment, exact control signal vector caching is done. Whenever an issue group is formed following instruction decode, register renaming, and dependency checking, an encoded copy of the issue group information can be cached under the tag of the leading instruction. The resulting dependency cache can be accessed right at the beginning of the instruction issue logic stage of the microprocessor pipeline the next time the corresponding group of instructions come up for re-execution. In another possible embodiment, since the encoded issue group (dependence) bit pattern may be accessed in a single cycle out of the cache, the resulting microprocessor pipeline with this embodiment can be seen as two parallel pipes, where the shorter pipe is followed if there is a dependency cache hit.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a flowchart illustrating the operation of a mechanism for a dependency cache in accordance with an exemplary embodiment of the present invention;

FIG. 6 illustrates pipeline latency reduction at the instruction issue stage in a microprocessor in accordance with an exemplary embodiment of the present invention;

FIG. 10 is an exemplary flowchart illustrating the operation of branch prediction driven control vector memoization in accordance with an exemplary embodiment of the present invention;

DETAILED DESCRIPTION OF THE PREFERRED EMBODIMENT

The present invention provides a dynamic exact and/or predictive caching apparatus and mechanisms in various stages of a microprocessor pipeline so that various control signals can be stored and memorized in the course of program execution. The exemplary aspects of the present invention improve microprocessor performance since some critical path pipeline stages, necessary for generating some control signals, can be bypassed during program run and the corresponding control signals not always regenerated thus saving the overhead associated with doing so. The exemplary aspects of the present invention involve storing direct control signal vectors that can be reused later in the execution pipeline. In particular, the focus is on direct control signals, as against densely encoded storage requiring significant further levels of processing before such data can be used.

In a typical microprocessor pipeline, there are many stages where control signals have to be generated and regenerated during typical workload execution. The generation and regeneration of these control signals occur in the critical path of the microprocessor during program execution, thus impacting the overall performance of the microprocessor. In accordance with an exemplary embodiment of the present invention, a mechanism is provided to store and use, or predict and check, control signals at some of these pipeline stages. In stages where these control signals can be used exactly, and hence the generation and regeneration bypassed, the pipeline becomes shorter and latency is reduced. This reduction in latency potentially leads to performance improvement. In other stages where stored control signals can only be predictive, execution with the control signals are started in parallel with a check and confirm approach. If the check and confirm method shows that the predicted control signals are not what the current control signals must be, then execution can be rolled back with the newly generated control signals.

Figure 1A:
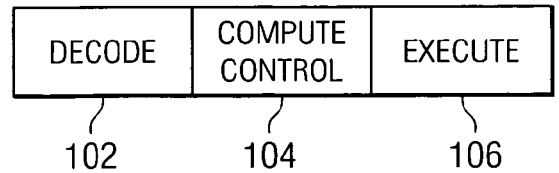
FIGS. 1A and 1B illustrate a learn-and-use configuration for exact control signal memoization in a microprocessor pipeline in accordance with an exemplary embodiment of the present invention.
Figure 1B:
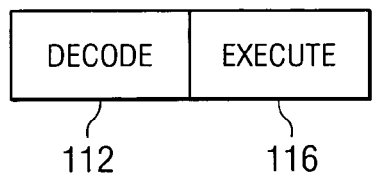

Basically, the two approaches of exact versus predictive can be expanded as follows. Both approaches need to go through the learning period. With reference to FIGS. 1A and 1B, a learn-and-use configuration for exact control signal memoization in a microprocessor pipeline is shown in accordance with an exemplary embodiment of the present invention. The original learning pipe goes through the normal decode 102, control signal computation 104, and using the derived control signals for execution 106 stages, where control signals are learned right away for the exact case. During the use of the learned or cached data, the exact approach pipe becomes shorter, involving just the decode 112 of the cached/learned control data and the use of that data for execution 116, as shown in FIG. 1B.

Figure 2A:
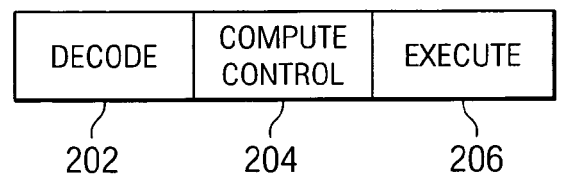
FIGS. 2A and 2B illustrate a learn-and-use configuration for predictive control signal memoization in a microprocessor pipeline in accordance with an exemplary embodiment of the present invention.
Figure 2B:
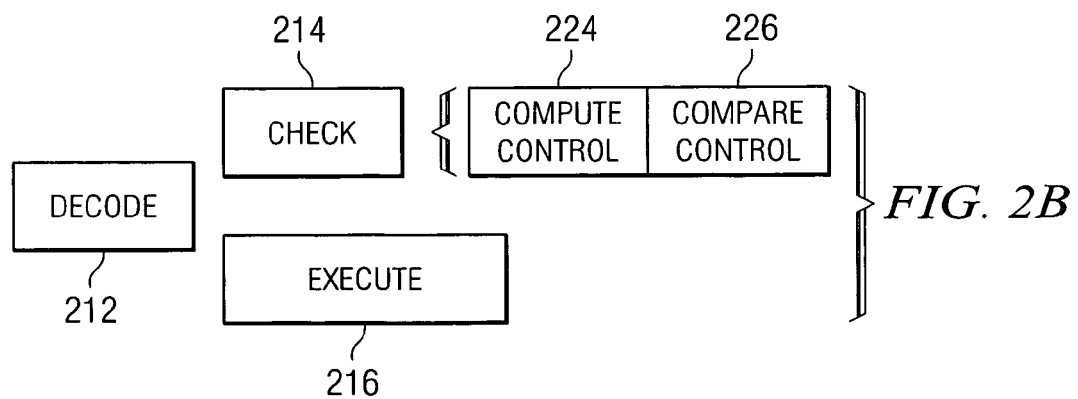

With reference to FIGS. 2A and 2B, a learn-and-use configuration for predictive control signal memoization in a microprocessor pipeline is shown in accordance with an exemplary embodiment of the present invention. The original learning pipe goes through the normal decode 202, control signal computation 204, and using the derived control signals for execution 206 stages, where control signals are learned right away for the exact case. For the predictive approach, the use involves a straight forward approach as in the exact case, that is, stored control signal decode 212 and use in execution 216, coupled in parallel with check 214, where control signals are generated 224 and compared 226 against the predicted signals that are already being used, as shown in FIG. 2B. If it is found that the predicted signals were not correct, execution then rolls back, to use the correct control signals.

Hence, for both approaches, the original learning pipe goes through the normal decode, control signal computation, and using the derived control signals for execution stages. The exemplary embodiments of the present invention differ from some current microprocessor approaches where some decoded information may be stored or kept in the instruction cache for use later in the pipe. In accordance with exemplary aspects of the present invention, control signal vector information is cached/stored and may be distributed in various structures at various stages in the pipeline. In particular, the current microprocessor practice of generating limited decode information during cache refill has some limitations. So also is the suggestion of storing control signals vector or decode information in the instruction cache. Such approaches are latency limited; either there is much computation involved or there is a significant increase in latency implying a very high instruction cache miss penalty. The instruction cache is somehow removed from the core and cannot easily produce all required control vector elements in a timely fashion. To store control vectors in the instruction cache, there are update problems. Control vectors are generated inside the processor core and, hence, to send this data and retrieve from the instruction cache, there are issues of long latency, wide and long physical busses, and problems to store to the instruction cache to deal with. In particular, a write to the instruction cache is bound to tie up the processor and disrupt a smooth instruction fetch stream.

This invention also differs from other well known predictive techniques like branch prediction. For example, branch predictors store history data, which is used to compute a prediction, and the control vector is generated based on the computed prediction. In the present invention, a dependency cache or control vector cache stores direct control vector signals, and for cases where those signals could change during different phases of execution, the stored control vectors become predictive in nature. For the predictive case, a use and check strategy may be adopted to verify the accuracy of the stored control signal values.

The dependency cache or control vector cache mechanism of the present invention is applicable to many and various stages in the microprocessor pipeline and even at the system level where control vector signals are generated and regenerated. For illustrative purposes only, a few practical example uses in the microprocessor pipeline are listed as follows:

1. Whenever an issue group is formed following instruction decode, register renaming and dependency checking in an out of order superscalar microprocessor pipeline, an encoded copy of the issue group information may be saved and reused in a dependency cache or control vectors cache;
2. Branch prediction data may be leveraged in generating other control vector signals;
3. The recycling buffer in a superscalar processor may be outfitted with a control vector cache to reuse control vectors;
4. Functional unit usage and need patterns may be cached and used with unit-level power and clock gating to save microprocessor power; and,
5. At the system level, cache coherence and bus transactions may be cached and/or memorized to save and/or reduce future bus communication and contention.

Some of these examples are described in detail below as exemplary embodiments of the present invention.

Dependency Cache or Control Signals Vector Cache

Contemporary high-performance processors rely on superscalar, superpipelining, and/or very long instruction word (VLIW) techniques for exploiting instruction-level parallelism in programs; that is, for executing more than one instruction at a time. In general, these processors contain multiple functional units, execute a sequential stream of instructions, are able to fetch from memory more than one instruction per cycle, and are able to issue/dispatch for execution more than one instruction per cycle subject to dependencies and availability of resources.

The pool of instructions from which the processor selects those that are dispatched/issued at a given point in time is enlarged by the availability of resources and by the use of out-of-order execution. Adequate availability of execution resources (e.g. multiple functional units) is more necessary for when operations in a sequential stream are executed in-order. Out-of-order execution is a technique by which the operations in a sequential stream of instructions are reordered so that operations appearing later are executed earlier if the resources required by the operation are free, thus reducing the overall execution time of a program. Out-of-order execution exploits the availability of the multiple functional units by using resources that may otherwise be idle. Reordering the execution of operations requires reordering the results produced by those operations so that the functional behavior of the program is the same as what would be observed if the instructions were executed in the original sequential order.

There are two basic approaches for implementing out-of-order execution and reordering of results: dynamic reordering and static reordering. In dynamic reordering, the instructions are analyzed at execution time and the instructions and results are reordered in hardware. In static reordering, a compiler/programmer analyzes and reorders the instructions and the results produced by those instructions when the program is generated, thus the reordering tasks are done in software. These two approaches can also be used jointly.

Figure 3A:
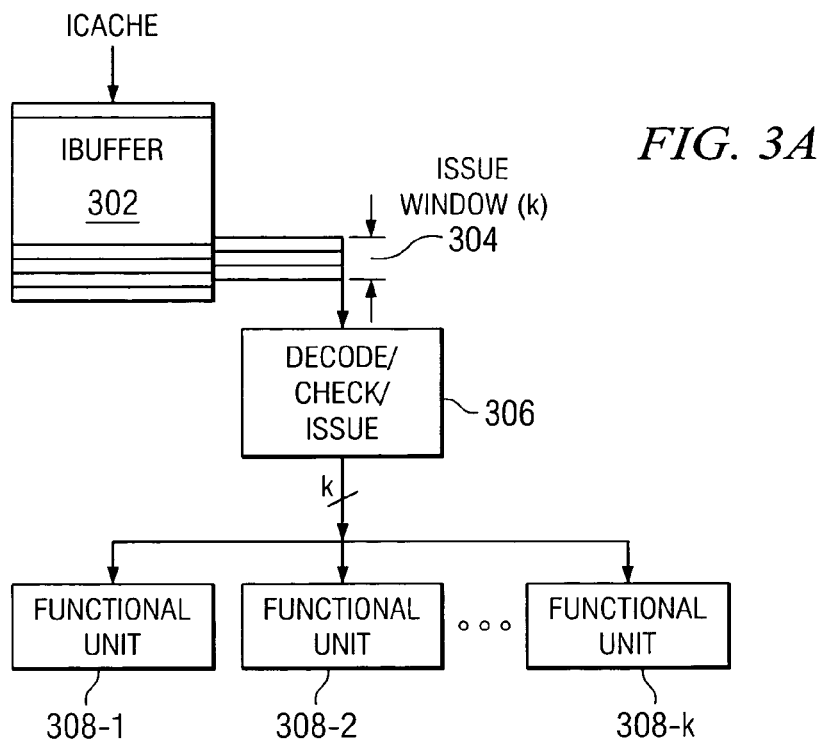
FIG. 3A shows an instruction issue superscalar with a central issue window.
Figure 4A:
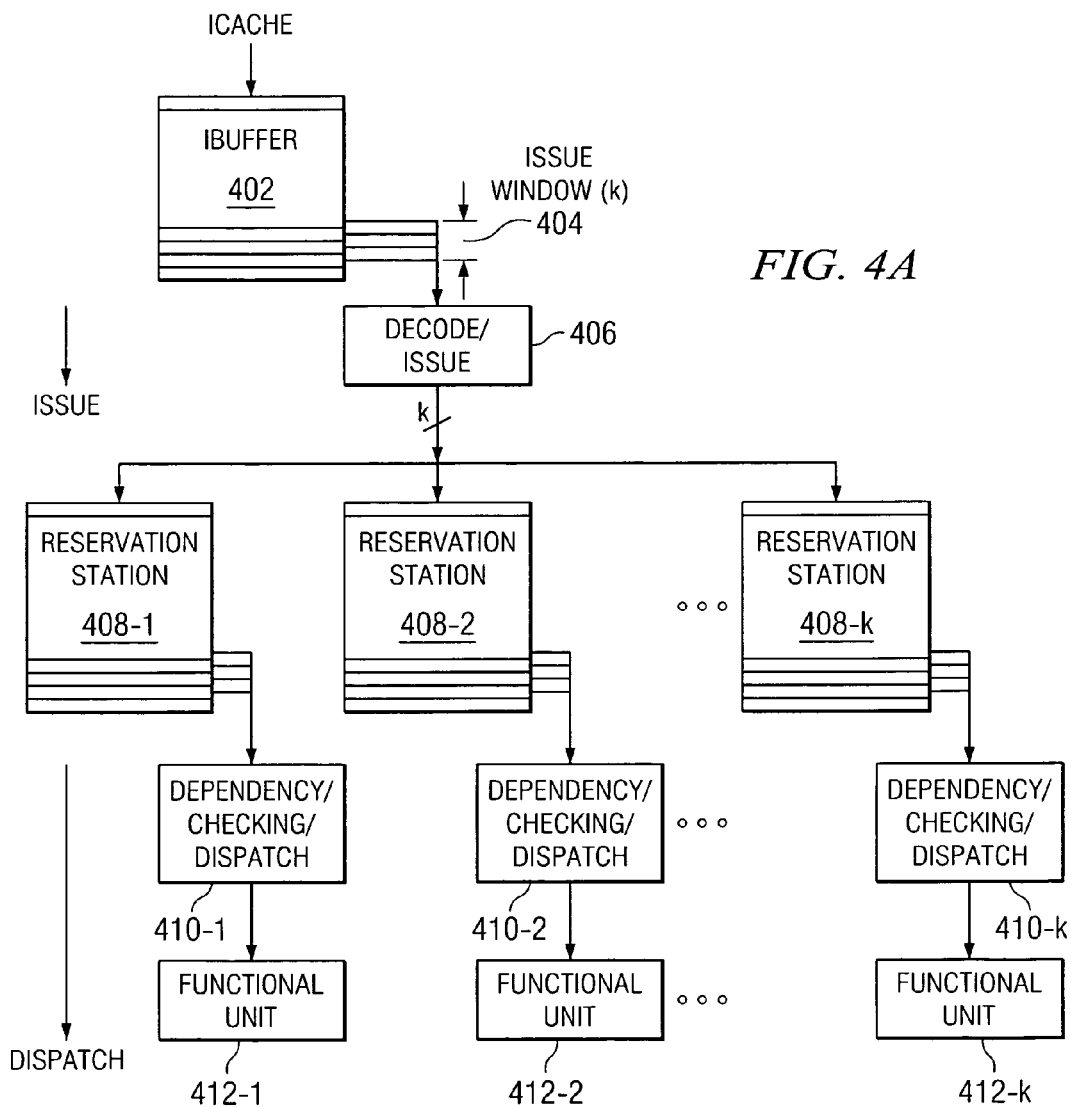
FIG. 4A shows an instruction issue superscalar with distributed reservation stations for instruction classes.

Consider a superscalar machine organization capable of issuing more than one instruction per cycle as depicted in FIG. 3A or FIG. 4A. One may assume that the instruction set executed by the processor is $I=\{I_1, I_2, \ldots I_n\}$ and that at most k instructions can be issued per cycle, described by the k-tuple $P=(i_1, i_2, \ldots, i_k)$, with $i_j$ belonging in I, where $j=1,2, \ldots k$. Also, assume that at least k instructions are fetched into an instruction buffer 302 and that a decision is reached on whether or not a k-instruction tuple 304 can be issued and executed in parallel. This decision making process, which occurs in the instruction issue (Decode/Check/Issue) logic 306, is usually based on: 1) the opcodes of the instructions, 2) availability of resources, and 3) the structural and data dependencies that exist among instructions within the decision window. In the example shown in FIG. 3A, instructions are issued to functional units 308-1 to 308-k.

FIG. 4A shows an instruction issue superscalar with distributed reservation stations for instruction classes. At least k instructions are fetched into an instruction buffer 402 and a decision is reached on whether or not a k-instruction tuple 404 may be issued and executed in parallel. This decision making process, which may occur in Decode/Issue logic 406, is usually based on: 1) the opcodes of the instructions, 2) availability of resources, and 3) the structural and data dependencies that exist among instructions within the decision window. As shown in FIG. 4A, instructions are issued through reservation stations 408-1 to 408-k and Dependency/Checking/Dispatch logic 410-1 to 410-k to functional units 412-1 to 412-k.

If the instruction issuing decision is based on opcodes, a number of rules needs to be put in place describing if and whether a sequence of instructions is potentially issuable, with respect to data dependencies, computational resource conflicts, etc. Suppose an example machine operates on the instruction set I={Add, Sub, Comp, Load, Store}, and issues at most two instructions per cycle, and have available two arithmetic logic units (ALU) executing the instructions Add, Sub, Comp. For such a machine a rule has to be in place as follows: "An acceptable ALU issuable pair is (Add, Add) or (Add, Sub) or (Add, Comp) or (Sub, Add) or (Sub, Sub) or (Sub, Comp) or (Comp, Add) or (Comp, Sub) or (Comp, Comp)." Instruction issuable rules for forming instruction issue groups logically form a "Rule Table," which is actually embedded in the Decode/Check/Issue logic stage of the microprocessor pipeline.

The complexity of the Decode/Check/Issue logic of our example superscalar machine organization, assuming primitive gates, is as follows: If issuing is performed based on opcodes, the complexity of checking data dependencies can be shown to be in the order of $k^3$ gates and log k gate delay, k being the issue width per cycle, when assuming infinite resources and in-order issuing. In assuming out-of-order issuing, the complexities are in the order of $2^k$ gates and log k gate delay, and for out-of-order issuing with register renaming, in the order of $2^k$ gates and k gate delay. When the resources are restricted, the complexity can be shown in the order of $n^k$ gates and $k^2$ log n delay, where n is the cardinality of the instruction set I. If issuing is performed using grouping of instructions rather than opcode specific description, the complexity is in the order of $m^k$ gates and $k^2$ log m delay, where m is the number of instruction groups.

For a more realistic superscalar machine organization, where the Decode/Check/Issue logic has to handle both data dependencies and restricted hardware resources, the required area complexity is the sum of the area of the data dependency logic and the area of the hardware conflict logic. Though both the data dependency logic and the hardware conflict logic could theoretically work in parallel, what happens in practice, however, is to first check the instruction buffer for data dependencies (eliminate some of them through register renaming) and proceed to attempt to issue as many instructions with no data dependencies as possible. The expected area complexity of $n^k$ gates and overall delay of $k^2$ log n could translate into a performance burden for a machine organization that has a wide issue width (k) and supports a large number of instructions (n). Superscalar machine organizations that follow this issue policy approach are as depicted in FIG. 3A.

Since the area complexity is dominated by the term depending on n, the number of instructions supported by the processor, a substantial reduction in complexity can be achieved by reducing the term. Two main reduction techniques that can be employed are 1) hierarchical partitioning of instructions, and 2) hardware utilization partitioning of instructions. These two techniques, separately and together, can lead to a substantial reduction in the actual rules that are implemented. The hierarchical partitioning technique 1) places a subset of instructions into a hierarchical class if they operate on the same set of registers (e.g., integer instructions like IADD, IMULT; floating-pt instructions like FADD, FMULT) and 2) views a subset of instructions as a separate class and treats the instructions separately if this subset of instructions manipulates some sets of registers. The hardware utilization partitioning technique groups instructions into classes. An instruction belongs to a given class if it uses the same hardware units as all the other instructions in that class. All the instructions in a class are viewed as the same instruction from the prospective of the issue logic. As a consequence of partitioning, all the instructions in a class are equivalent from the perspective of the issue logic. Hence, instead of rules for instruction tuples, there are rules for class tuples. Consequently, the number of rules to check whether or not a k-instruction tuple can be issued in parallel diminishes. For example, if we assume k=2, the rule table will reduce in dimension from $n^2$ to $m^2$. In general, the overall area complexity reduces to $m^k$ gates and the overall delay reduces to $k^2$ log m. Superscalar machine organizations that adopt this class issue policy (instruction shelving) approach are as depicted in FIG. 4A.

Large delay for the Decode/Check/Issue logic can actually mean that multiple pipeline stages are necessary for handling decode and issue. However, that can be very detrimental to performance because of the more complicated and lengthy procedure such a machine organization will need in order to recover from miss-predicted branches for example. As device technology improves and device sizes shrink, with the average microprocessor frequency soaring, the instruction issue logic is bound to be more complex, take a few more (~3, 4, 5, ...) microprocessor cycles, and result in a severe penalty in microprocessor performance, irrespective of whether the delay is $k^2$ log m or $k^2$ log n.

Figure 3B:
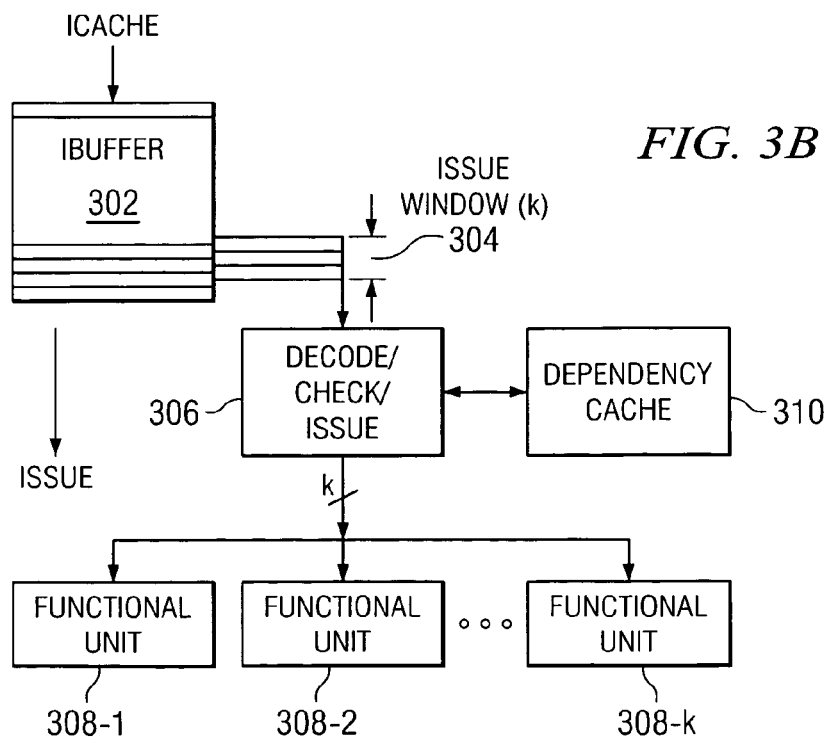
FIG. 3B shows an instruction issue superscalar equipped with a dependency cache in accordance with an exemplary embodiment of the present invention.
Figure 4B:
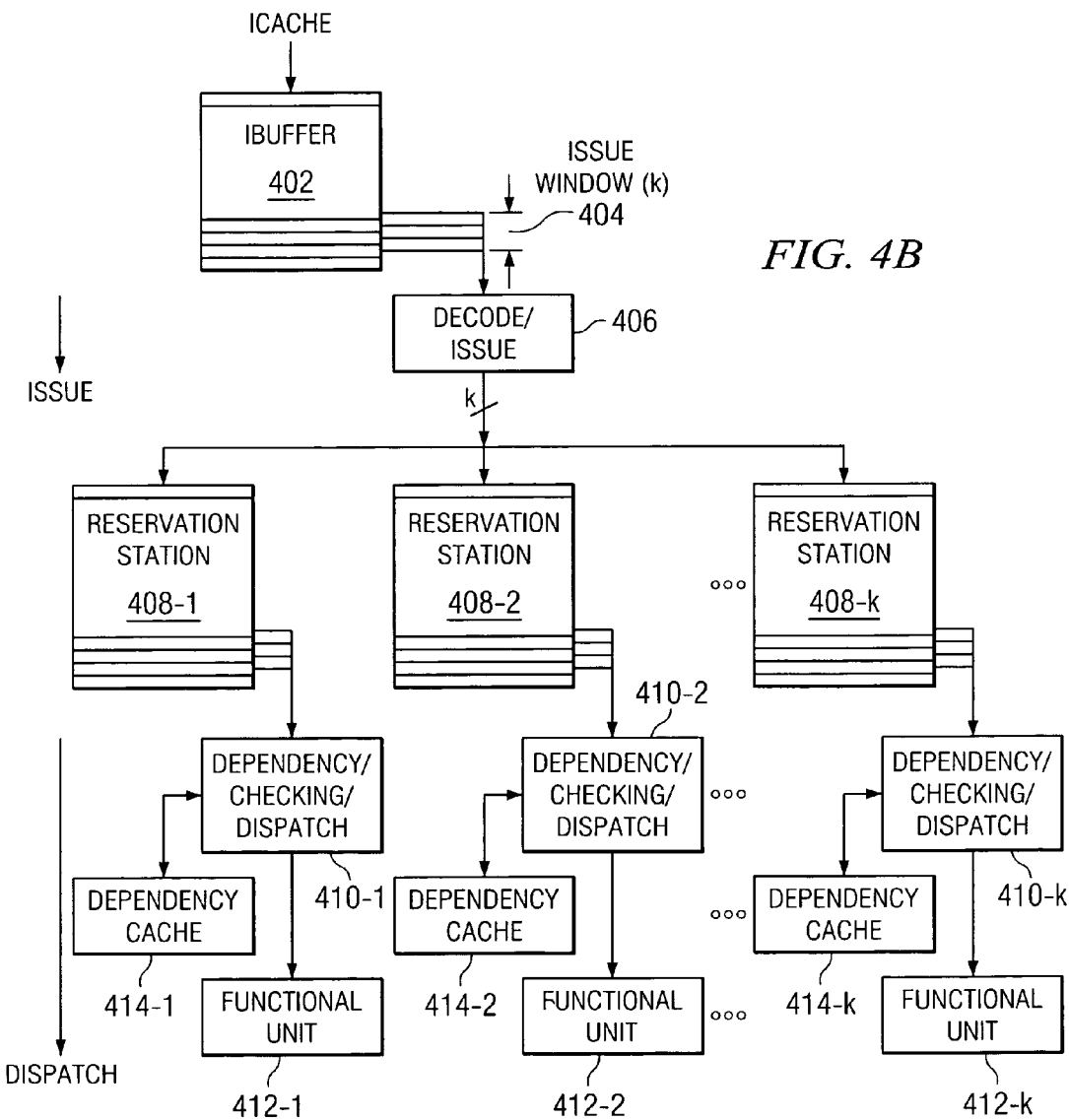
FIG. 4B shows an instruction issue superscalar equipped with dependency cache for each reservation station group in accordance with an exemplary embodiment of the present invention.
Figure 4C:
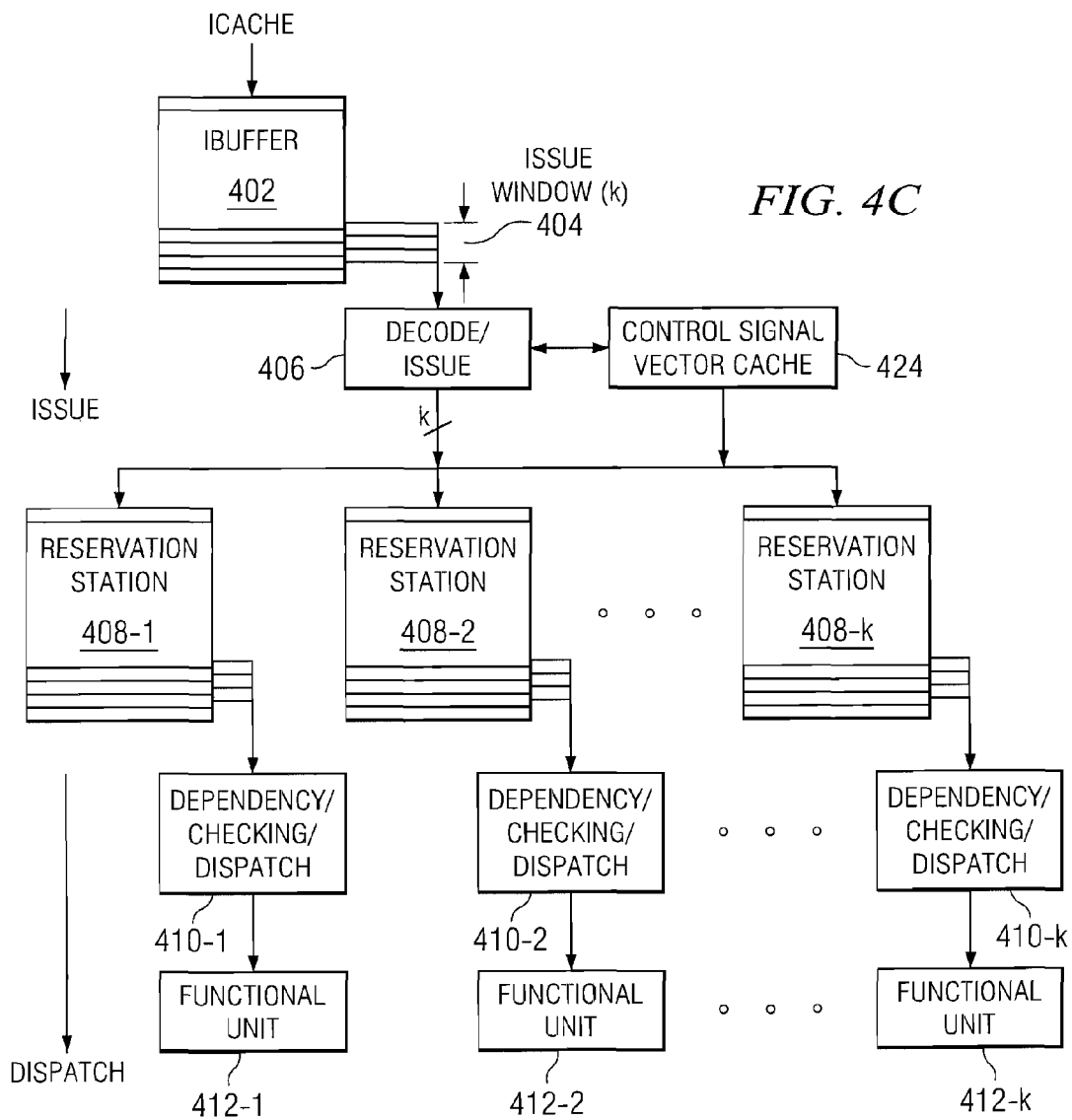
FIG. 4C shows an instruction issue superscalar equipped with control signals vector cache in accordance with an exemplary embodiment of the present invention.

In accordance with one exemplary embodiment of the invention, a dependency cache 310 is coupled at the start of the Decode/Check/Issue logic 306 of the pipeline as depicted in FIG. 3B. Similarly, a dependency cache 414-1 to 414-k is coupled at the Check/Dispatch logic 410-1 to 410-k of the pipeline as shown in FIG. 4B. In an alternative embodiment, a control signals vector cache 424 may be coupled at the start of the Decode/Check/Issue logic 406 as depicted in FIG. 4C. The presence of the dependency cache for both approaches as outlined above for FIG. 3B and FIG. 4B or the control vector signal cache as outlined in FIG. 4C are not technically different, and the discussion for these various embodiments may be generally restricted to the approach in FIG. 3B for both simplicity and clarity. The issue processing adopted in FIG. 4A uses the shelving (class partitioning) approach where instruction issue and dependency checking are somehow decoupled. The principle of shelving delays dependency checking to a later step of processing called dispatching. During dispatch, the processor checks the instructions held in the reservation stations for dependencies and forwards dependency-free instructions to available functional units. It can be seen that shelved instructions make up distributed dispatch windows, not very much different from the centralized instruction window approach in FIG. 3A.

FIG. 5 is a flowchart illustrating the operation of a mechanism for a dependency cache in accordance with an exemplary embodiment of the present invention. At the start of the Decode/Check/Issue logic (or the issue logic processing) stage, the address of the lead instruction in the issue window is used to look up the dependency cache for previously generated instruction issue group pattern code while full scale data dependency and hardware conflict checks among the instructions within the defined window is started (block 502). A determination is made as to whether the dependency cache lookup results in a hit on an entry (block 504). If the dependency cache lookup results in a hit, the ongoing issue logic processing is abandoned (block 506) and the cached instruction issue group pattern code is used to drive the instructions that can be issued in parallel per cycle (block 508).

The issue logic then begins instruction group issuing (block 510). Then, a determination is made as to whether all the instructions in the defined window are issued (for a fixed issue window implementation) or new instructions are added onto what is left in the window (for a gliding issue window implementation) (block 512). If the issue logic is not done issuing, operation returns to block 510. When the issue logic is done issuing in block 512, operation returns to block 502 where the microprocessor waits to look up the dependency cache and start issuing for the next issue window.

Returning to block 504, if the dependence cache look-up results in a miss, the issue logic processing completes normally (possibly taking multiple cycles) (block 514) and while the resulting issue group patterns code is used to drive the instruction issue as described above, a copy of the issue group pattern is cached in the dependency cache (block 516).

The issue logic then begins instruction group issuing (block 518). Then, a determination is made as to whether all the instructions in the defined window are issued (for a fixed issue window implementation) or new instructions are added onto what is left in the window (for a gliding issue window implementation) (block 520). If the issue logic is not done issuing, operation returns to block 518. When the issue logic is done issuing in block 520, operation returns to block 502 where the microprocessor waits to look up the dependency cache and start issuing for the next issue window.

As FIG. 6 shows, the microprocessor pipeline with the illustrated embodiment results in two parallel pipes, where the shorter pipe 604 is followed when there is a hit in the dependency cache and the longer pipe 602 is followed when there is a dependency cache miss. A comparison among the two pipes shows that there is a possible savings of about (n-k) pipeline latency 606 whenever dependency caching hits, where n is the number of pipeline stages for traditional issue and k is the pipeline stages spent to access and retrieve a dependency cache entry. It is expected that since there is greater reuse of some instructions in a typical program trace, there will be enough hits to the dependency cache so as to amortize the total performance penalty on multiple Decode/Check/Issue pipeline stages that are likely to affect aggressive high-frequency, low-power multiple instruction issue microprocessor designs.

Figure 7:
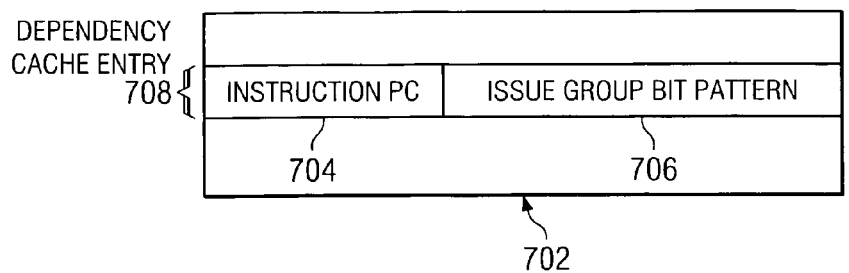
FIG. 7 depicts a sample dependency cache structure showing a dependency cache entry with an issue group bit pattern in accordance with an exemplary embodiment of the present invention.

FIG. 7 depicts a dependency cache structure 702 including a dependency cache entry 708 of an issue group bit pattern. The tag for a dependency cache entry is the instruction program counter (PC) address 704. The issue group pattern is bit coded 706. The width of the issue group bit pattern entry depends on both the issue width and the width of the instruction buffer. For example, consider the following four instructions running on a superscalar machine organization that is capable of issuing four instructions from an instruction buffer of four instructions:

I1 Add R1, R2, R3
I2 Add R6, R1, R7
I3 Sub R1, R8, R9
I4 Sub R6, R13, R14

Given that there exists the resources to issue all four instructions in parallel, the next important question is that are there any data dependencies that can block these instructions from issuing together? Clearly, there exists a pure dependency between I1 to I2 (register R1), anti-dependency between I1 to I3 (register R1), and output dependencies between I2 to I4 (register R6) and I1 to I3 (register R1). It can be shown that these four instructions, assuming they can be issued out-of-order, may have to be issued for best results over a 3 cycle period in the following order: I1, I4|I3|I2. There are many ways issue group bit patterns may be formed or generated. One such possible formation example is presented here. A person of ordinary skill in the art will be able to apply this example to other issue group patterns. In this example, for best-case scenario, all the instructions can be issued at once in parallel and, for worst case scenario, they will have to be issued in series. What this means is that a typical entry for I1 in a dependency cache may consist of a single issue group code (when all four instructions are issued in parallel at once) or up to four codes (when all four instructions are issued in series), where each code should be $2^4-1=15$ bits wide. Hence, for our example machine organization with a four-instruction buffer capable of issuing four instructions per cycle, a total of 60 bits is needed to form the necessary issue group bit pattern.

In the generation of issue group bit pattern, this example issue group avoids speculation and, hence, does not form issue groups to include branches or other instructions that may potentially lead to processor change of flow. Consider a sample instruction sequence as follows:
I1 Add R1, R2, R3
I2 Add R6, R1, R7
I3 Sub R1, R8, R9
I5 Br Cnt, I1
The fourth instruction, I5, is now a conditional branch that may or may not be taken based on the value of Cnt. Since there is no guarantee that instruction I5 will behave similarly from one execution run to another, the implementation must limit the cacheable issue group patterns to exclude such instructions. In this case, the cached issue group bit pattern will cover only I1, I2, and I3. However, one may apply additional techniques that may include speculation in the bit pattern formation, for example. In the case where speculation is employed, the dependency cache approach adopted here may be rendered predictive, in which case a dependency cache hit may need to be checked for correctness. A use and check strategy as illustrated in FIG. 2B then becomes necessary.

Figure 8:
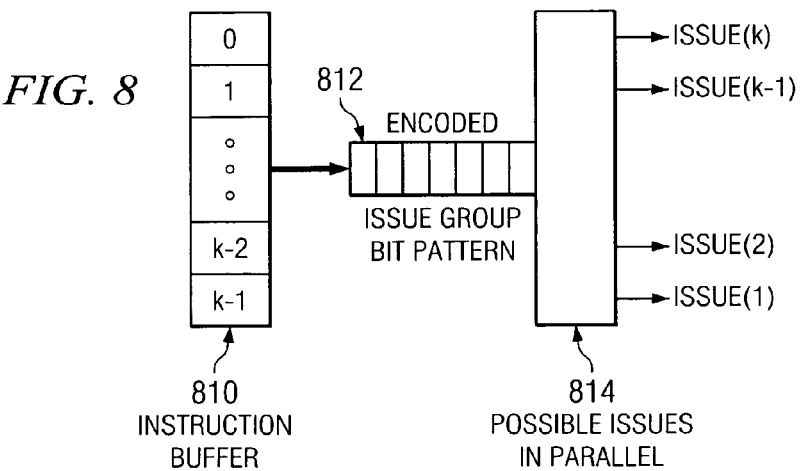
FIG. 8 shows an example issue logic using the issue group bit pattern to drive instruction issuing for the dependency cache in accordance with an exemplary embodiment of the present invention.

FIG. 8 shows an example issue logic using the issue group bit pattern to drive instruction issuing for the dependency cache in accordance with an exemplary embodiment of the present invention. If a dependency cache lookup results in a hit on an entry, the ongoing issue logic processing is abandoned, and the cached instruction issue group pattern code 812 is used to drive the instructions from instruction buffer 810 that can be issued in parallel per cycle until all the instructions in the defined window are issued (for a fixed issue window implementation) or new instructions are added onto what is left in the window (for a gliding issue window implementation) for the issue process to begin again. The resulting instructions from instruction buffer 810 that are issued as a group 814 correspond to encoded issue group bit pattern 812. Each subsequent occurrence of the same issue group will result in a dependency cache hit.

Branch Prediction Control Vector Memoization

Figure 9:
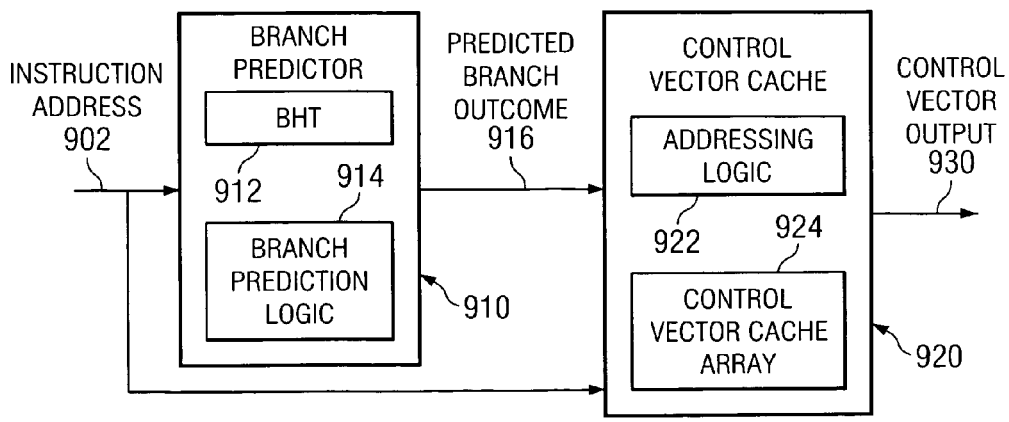
FIG. 9 illustrates an example branch prediction driven control vector memoization in accordance with an exemplary embodiment of the present invention.

FIG. 9 illustrates an example branch prediction driven control vector memoization in accordance with an exemplary embodiment of the present invention. A first branch predictor 910 is implemented, yielding a branch prediction outcome 916 of "taken/not taken" for a branch whose instruction address is presented at 902. In one exemplary embodiment, the branch predictor 910 includes branch history table (BHT) 912 and branch prediction logic 914. In another embodiment in accordance with the present invention, other components may be used to implement a branch predictor 910 to determine the predicted outcome of a branch as "taken/not taken" at the output 916. In yet another embodiment, the predictor may produce information on a predicted path.

In accordance with an exemplary embodiment of the present invention, the branch predictor 910 is operatively coupled with a control vector cache 920 including addressing logic 922 and a control vector cache array 924. In one embodiment, addressing logic 922 generates an array address, the branch instruction address, and the predicted branch outcome, e.g., by selecting a subset of the instruction address bits and concatenating them with the branch prediction outcome. In another embodiment, a hash input of a plurality of instruction address bits and the branch prediction outcome is performed. Other forms of address generation, e.g., with other identifiers for a specific branch in lieu of the branch instruction address, information about the path executed prior to encountering the branch address, predicted path information in lieu of a taken/not taken indicator, and so forth, may be employed.

The array address may be used to access control vector cache array 924. Additional logic may be employed to identify if there has occurred a cache miss and optionally indicated a hit or miss in the control vector cache array 924. The output of array 924 is a control vector 930, which may contain a plurality of bits, e.g., to control pipeline flush logic, branch restore logic, issue logic, etc.

FIG. 10 is an exemplary flowchart illustrating the operation of branch prediction driven control vector memoization in accordance with an exemplary embodiment of the present invention. Operation begins and the branch predictor predicts a branch (block 1002) and reads the access control vector cache array (block 1004). A determination is made as to whether an entry is found for the predicted branch (block 1006). If an entry is not found, a control vector is computed (block 1008) and the access control vector cache array is written to store the computed control vector (block 1010). The computed control vector is used to control execution in pipe (block 1012). Thereafter, operation ends. A variety of control signals for the control vector may be computed using state from the execution environment of the current instruction, e.g., information about whether the fetch engine has fetch instructions from the fall-thru or the branch target path to determine whether to flush and restart instruction fetch, information about the dependencies with respect to previous instructions to determine an appropriate instruction issue delay, information about an annul bit to control potential squashing of instructions in a branch delay slot in architectures implementing such delay slot, etc. In other embodiments, arrays may be combined, e.g., by combining the branch history array with the control vector cache array.

If an entry is found in block 1006, the branch predictor uses the predicted control vector to control execution in the pipe (block 1014). Simultaneously, a control vector is computed (block 1016) and compared to the predicted control vector (block 1020). If the computed control vector is not different from the predicted control vector, the prediction is considered a success (block 1024), the results of using the predicted control vector to control execution in block 1014 are accepted, and operation ends. If, however, the computed control vector is different from the predicted control vector in block 1022, then the access control vector cache array is written to store the computed control vector (block 1026). Then, corrective action is taken (block 1028) and operation ends.

Recycling Buffer with Control Signal Vector Cache

Figure 11A:
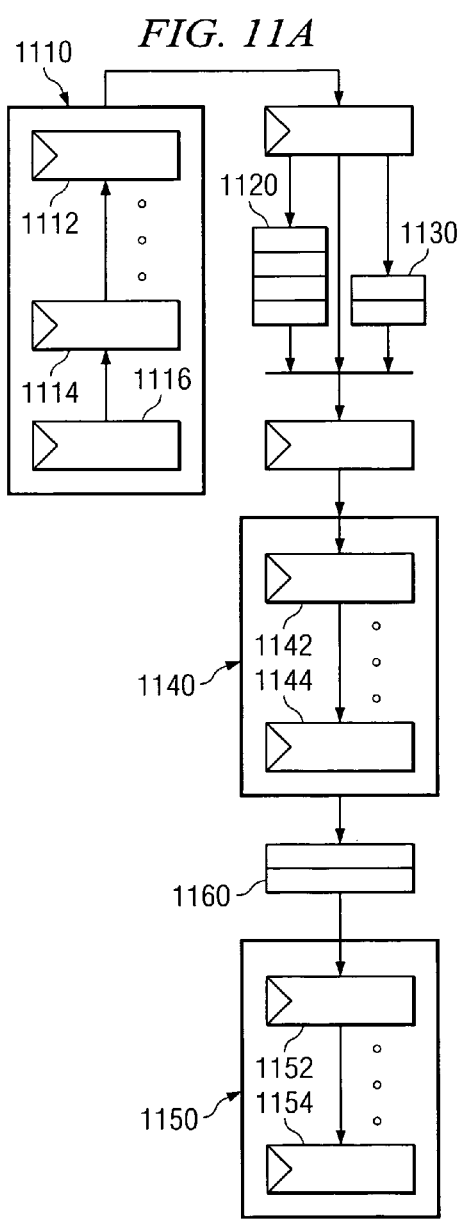
FIG. 11A illustrates an implementation of a recycle buffer in a microprocessor pipeline.

FIG. 11A illustrates an implementation of a recycle buffer in a microprocessor pipeline, which consists of an instruction fetch pipeline 1110, decode/rename/dispatch/issue pipeline 1140, and execution pipeline 1150. The instruction fetch pipeline may have multiple stages, separated by latches 1112, 1114, to 1116. The decode/rename/dispatch/issue pipeline 1140 may consist of multiple stages separated by latches 1142 to 1144. Not all components of the decode/rename/dispatch/issue pipeline have to be implemented in a processor. The execution pipeline 1150 may consist of multiple stages separated by latches 1152 to 1154. The processor may optionally have an instruction buffer 1130, which decouples the fetch and the decode/rename/dispatch/issue engine and an issue buffer (window) 1160, which decouples the decode/rename/dispatch/issues engine from the execution engine.

Recycle buffer 1120 is used to store instructions entering the pipeline so that if there is a condition when some of the instructions in the pipeline need to be flushed and re-executed, these instructions are supplied by the recycle buffer, rather than the n-cycle access instruction cache. This way the penalty of flush and re-execution is reduced by the number of cycles it takes to access the instruction cache. In the prior art, instructions from the recycle buffer are inserted in the pipeline before the decode/rename/dispatch/issues stages because the prior art recycle buffer does not store control signals needed for stages down the pipeline. Therefore instructions from the recycle buffer are inserted at the top of the decode/rename/dispatch/issues, during which these control signals are generated. With this implementation the penalty of pipeline flush/re-execute events includes the pipeline depth or latency through the decode/rename/dispatch/issues stages.

Figure 11B:
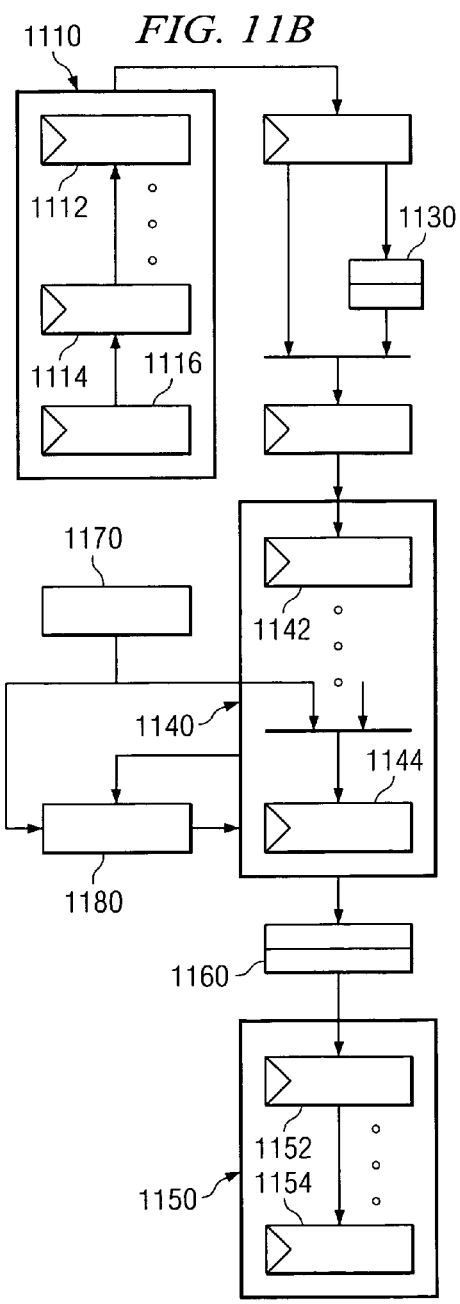
FIG. 11B illustrates an example implementation of a recycle buffer using a control vector cache in accordance with an exemplary embodiment of the present invention.
Figure 11C:
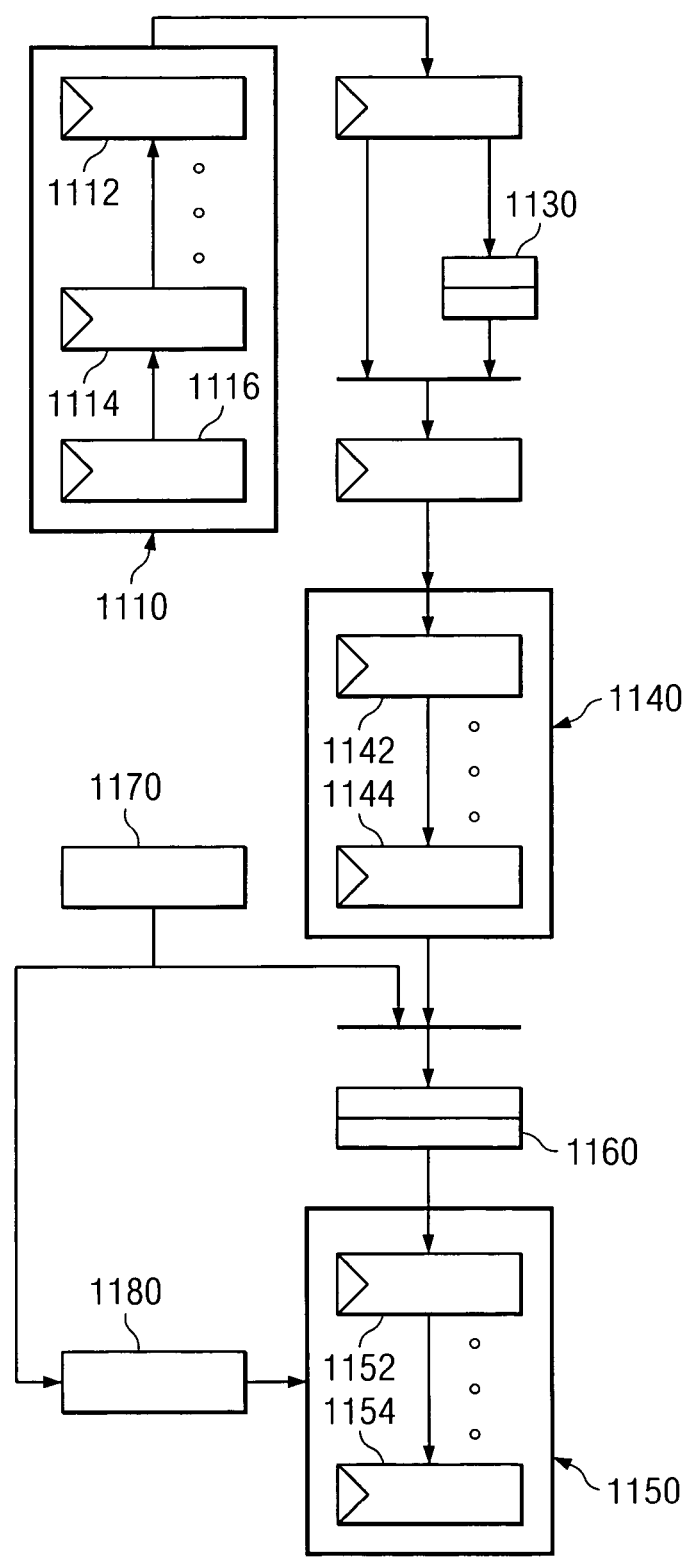
FIG. 11C illustrates an implementation of a recycle buffer using a control vector cache with instructions from the recycle buffer being inserted directly into the issue window in accordance with an exemplary embodiment of the present invention.

FIG. 11B illustrates an example implementation of a recycle buffer using a control vector cache in accordance with an exemplary embodiment of the present invention. Instruction inserted into the pipeline from the recycle buffer 1170 also accesses the control vector cache 1180 to retrieve all control bits that need to be generated before the pipeline stage at which instructions from the recycle buffer 1170 are inserted. In the implementation shown in this figure, instructions from the recycle buffer 1170 are inserted at the final stage 1144 of the decode/rename/dispatch/issue pipeline 1140. However, the instruction insertion point could be anywhere in the decode/rename/dispatch/issue pipeline. It should be clear to a person of ordinary skill in the art that there is a tradeoff between the number of control bits that need to be stored in control vector cache 1180 and the flush/re-execute penalty. The lower (farther from fetch and close to execute) the instruction insertion point is, the smaller the flush/re-execute penalty is, and the larger the size of the control vector that needs to be stored in control vector cache 1180. As an example, FIG. 11C shows an embodiment where instructions from recycle buffer 1170 are inserted directly into the issue window (also called reservation station or issue buffer) 1160, or directly into the execution pipeline 1150.

Thus, the present invention solves the disadvantages of the prior art by providing a dynamic predictive and/or exact caching apparatus and mechanism in various stages of a microprocessor pipeline so that various control signals can be stored and memorized in the course of program execution. A common occurrence in these pipelines is the generation and regeneration of various control flow signals. Often, the control signals generated in many of these pipeline stages are repetitive, and amenable to prediction. In situations where such signals can be cached or easily predicted, it would allow bypassing pipeline stages from the critical path when they can be accurately predicted or reused (if cacheable), resulting in a net improvement in CPI, and hence overall better performance.

Control signals can be cached precisely, or they may be predictive, and must be checked in parallel with execution. In the later case, the checking—consisting of recomputing and comparing to the predicted control signals—can be performed in parallel to the execution using the predicted control signals. If the prediction is found to be incorrect, corrective measures are taken. If not, several pipeline stages have been eliminated from the critical path. There are many known corrective measures in the literature e.g., flush pipe and roll back to a known good state.

It should also be readily apparent from the above description that when comparing predicted state with computed state in a predictive scenario, the comparison can allow deviations which are conservative in nature: e.g., tolerate the insertion of a pipeline bubble to deal with a predicted dependence even if no dependence exists. (Evidently, a preferred embodiment may update the prediction for the improved schedule. Another preferred embodiment may use some conservative assumptions—possibly with hysteresis—to ensure successful execution in a variety of frequent scenarios, e.g., by always predicting a one cycle bubble if both the 0-cycle and 1-cycle dependence chains occur frequently for a given instruction.)

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for multiple instruction issue in a microprocessor, the method comprising:
    identifying an instruction group to be issued to a plurality of functional units in the microprocessor;
    determining whether a dependency cache entry exists for the instruction group in a dependency cache, wherein the dependency cache entry includes control signals for executing the instruction group in a pipe in the microprocessor;
    responsive to a dependency cache entry existing for the instruction group, using the control signals in the dependency cache entry to control execution of the instruction group in the microprocessor; and
    responsive to a dependency cache entry not existing for the instruction group in the dependency cache, computing control signals for the instruction group to form computed control signals and storing the computed control signals in the dependency cache in association with the instruction group.

2. A method for multiple instruction issue in a microprocessor, the method comprising:
    identifying an instruction group to be issued to a plurality of functional units in the microprocessor;
    determining whether a dependency cache entry exists for the instruction group in a dependency cache, wherein the dependency cache entry includes control signals for executing the instruction group in a pipe in the microprocessor, and wherein the control signals in the dependency cache entry form predicted control signals;

responsive to a dependency cache entry existing for the instruction group, using the predicted control signals in the dependency cache entry to control execution of the instruction group in the microprocessor;

computing control signals for the instruction group to form computed control signals;

comparing the computed control signals with the predicted control signals; and responsive to the computed control signals matching the predicted control signals, accepting execution of the instruction group in the microprocessor based on the predicted control signals.

3. The method of claim 2, further comprising:

responsive to the computed control signals not matching the predicted control signals, storing the computed control signals in the dependency cache in association with the instruction group and using the computed control signals to control execution of the instruction group in the microprocessor.

4. A microprocessor comprising:

an instruction buffer;

instruction decode and issue logic;

a dependency cache; and a plurality of functional units, wherein the instruction decode and issue logic:
- identifies an instruction group in the instruction buffer to be issued to the plurality of functional units;
- determines whether a dependency cache entry exists for the instruction group in the dependency cache, wherein the dependency cache entry includes control signals for executing the instruction group in the microprocessor;
- uses the control signals in the dependency cache entry to control execution of the instruction group responsive to a dependency cache entry existing for the instruction group; and
- computes control signals for the instruction group to form computed control signals and stores the computed control signals in the dependency cache in association with the instruction group responsive to a dependency cache entry not existing for the instruction group in the dependency cache.

5. A microprocessor comprising:

an instruction buffer;

instruction decode and issue logic;

a dependency cache; and a plurality of functional units, wherein the instruction decode and issue logic:
- identifies an instruction group in the instruction buffer to be issued to the plurality of functional units;
- determines whether a dependency cache entry exists for the instruction group in the dependency cache, wherein the dependency cache entry includes control signals for executing the instruction group in the microprocessor, and wherein the control signals in the dependency cache entry form predicted control signals;
- uses the predicted control signals in the dependency cache entry to control execution of the instruction group responsive to a dependency cache entry existing for the instruction group;
- computes control signals for the instruction group to form computed control signals;
- compares the computed control signals with the predicted control signals, and
- accepts execution of the instruction group in the microprocessor based on the predicted control signals responsive to the computed control signals matching the predicted control signals.

6. The microprocessor of claim 5, wherein the instruction decode and issue logic stores the computed control signals in the dependency cache in association with the instruction group and uses the computed control signals to control execution of the instruction group responsive to the computed control signals not matching the predicted control signals.

* * * * *